US011038789B2

(12) United States Patent
Avidan et al.

(10) Patent No.: US 11,038,789 B2
(45) Date of Patent: Jun. 15, 2021

(54) SYSTEM AND METHOD FOR AUTOMATED GENERATION OF WEB DECODING TEMPLATES

(71) Applicant: Verint Systems Ltd., Herzliya Pituach (IL)

(72) Inventors: Rachel Avidan, Herzliya Pituach (IL); Maor Korakin, Herzliya Pituach (IL)

(73) Assignee: VERINT SYSTEMS LTD., Pituach (IL)

( * ) Notice: Subject to any disclaimer, the term of this patent is extended or adjusted under 35 U.S.C. 154(b) by 685 days.

(21) Appl. No.: 15/869,357

(22) Filed: Jan. 12, 2018

(65) Prior Publication Data

US 2018/0205630 A1 Jul. 19, 2018

Related U.S. Application Data

(63) Continuation of application No. 14/324,022, filed on Jul. 3, 2014, now Pat. No. 9,871,715.

(30) Foreign Application Priority Data

Jul. 4, 2013 (IL) ........................................ 227332

(51) Int. Cl.
*H04L 12/26* (2006.01)
*G06F 16/00* (2019.01)
*H04L 29/08* (2006.01)

(52) U.S. Cl.
CPC .............. *H04L 43/18* (2013.01); *G06F 16/00* (2019.01); *H04L 43/028* (2013.01); *H04L 43/04* (2013.01); *H04L 67/02* (2013.01)

(58) Field of Classification Search
CPC ....... H04L 43/18; H04L 43/028; H04L 43/04; H04L 67/02; G06F 16/00
(Continued)

(56) References Cited

U.S. PATENT DOCUMENTS 5,689,442 A 11/1997 Swanson et al.
6,404,857 B1 6/2002 Blair et al.
(Continued)

OTHER PUBLICATIONS

Aho, Alfred V., et al., "Efficient String Matching: An Aid to Bibliographic Search," Communication of the ACM, Jun. 1975, vol. 18, No. 6, pp. 333-340.
(Continued)

*Primary Examiner* — David R Vincent
(74) *Attorney, Agent, or Firm* — ISUS Intellectual Property PLL; Anthony Jason Morabito

(57) ABSTRACT

Methods and systems for decoding communication protocols having an unknown structure. In the disclosed embodiments, a decoding system analyzes network traffic that uses such a communication protocol, and semi-automatically generates a structured template for decoding the protocol. In an example embodiment, the traffic comprises HTTP transactions used in some unknown variant of a Web-based e-mail or social network application, and the system generates an Extensible Markup Language (XML) template for parsing such transactions. The system enables an analyst to review sample transactions, and identify target components of the protocol that contain target information of interest. The system typically generates a set of rules with the assistance of the analyst.

13 Claims, 7 Drawing Sheets

RECEIVE NETWORK TRANSACTIONS OF TARGET PROTOCOL — 70

DIVIDE TRANSACTIONS INTO HTTP REQUEST-RESPONSE PAIRS — 74

SCAN PAIRS AND RETAIN PAIRS OF INTEREST — 78

ANALYZE PAIRS TO DEFINE RECOGNITION RULES, EXTRACTION RULES AND PRODUCER RULES — 82

GENERATE XML TEMPLATE FOR DECODING TARGET PROTOCOL — 86

(58) Field of Classification Search
USPC .................................................... 706/15, 45
See application file for complete search history.

(56) References Cited

U.S. PATENT DOCUMENTS

| | | | | |
|---|---|---|---|---|
| 6,718,023 | B1 | 4/2004 | Zolotov | |
| 6,757,361 | B2 | 6/2004 | Blair et al. | |
| 7,216,162 | B2 | 5/2007 | Amit et al. | |
| 7,466,816 | B2 | 12/2008 | Blair | |
| RE40,634 | E | 2/2009 | Blair et al. | |
| 7,587,041 | B2 | 9/2009 | Blair | |
| 2003/0009563 | A1* | 1/2003 | Douglis | H04L 29/06 709/227 |
| 2007/0053297 | A1 | 3/2007 | Wu et al. | |
| 2007/0083644 | A1 | 4/2007 | Miller et al. | |
| 2008/0014873 | A1 | 1/2008 | Krayer et al. | |
| 2008/0228867 | A1 | 9/2008 | Murphy | |
| 2008/0261192 | A1 | 10/2008 | Huang et al. | |
| 2008/0285464 | A1 | 11/2008 | Katzir | |

OTHER PUBLICATIONS

Cloudshield, Inc., "Lawful Intercept Next-Generation Platform," 2009, 6 pages.

Coffman, T., et al., "Graph-Based Technologies for Intelligence Analysis," CACM, Mar. 2004, 12 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Fisk, Mike, et al., "Applying Fast String Matching to Intrusion Detection," Los Alamos National Laboratory and University of California San Diego, Jun. 1975, 22 pages.

FoxReplay Analyst, Fox Replay BV, http//www.foxreplay.com, Revision 1.0, Nov. 2007, 5 pages.

FoxReplay Analyst Product Brochure, Fox-IT BV, http//www.foxreplay.com, 2006, 2 pages.

Goldfarb, Eithan, "Mass Link Analysis: Conceptual Analysis," Jun. 24, 2007, Version 1.1, 21 pages.

Netronome SSL Inspector Solution Overview White Paper, "Examining SSL-encrypted Communications," 2010, 8 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Rohde & Schwarz GmbH & Co. KG, "ACCESSNET-T, DMX-500 R2, Digital Mobile eXchange," Product Brochure, Secure Communications, Mar. 2000, 4 pages.

Rohde & Schwarz GmbH & Co. KG, "ACCESSNET-T IP," Product Brochure, Secure Communications, Jan. 2000, 4 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "Integrated Digital Audio Software R&S AllAudio," Specifications, 2000, 8 pages.

Rohde & Schwarz GmbH & Co. KG, "R&S RA-CM Continuous Monitoring Software," Product Brochure, Radiomonitoring & Radiolocation, Jan. 2001, 16 pages.

Rohde & Schwarz GmbH & Co. KG, "R&S RAMON COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

Schulzrinne, H., et al., "RTP: A Transport Protocol for Real-Time Applications," Standards Track, Jul. 2003, 89 pages.

Sheng, Lei, et al., "A Graph Query Language and Its Query Processing," IEEE, Apr. 1999, pp. 572-581.

Soghoian, Christopher, et al., "Certified Lies: Detecting and Defeating Government Interception Attacks Against SSL," 2010, 19 pages.

Svenson, Pontus, et al., "Social network analysis and information fusion for anti-terrorism," CIMI, 2006, 8 pages.

Tongaonkar, Alok S., "Fast Pattern-Matching Techniques for Packet Filtering," Stony Brook University, May 2004, 44 pages.

Verint Systems Inc., "Mass Link Analysis: Solution Description," Dec. 2008, 16 pages.

Yu, Fang, et al., "Fast and Memory-Efficient Regular Expression Matching for Deep Packet Inspection," ANCS'06, San Jose, California, Dec. 3-5, 2006, 10 pages.

Wang, Yu, et al., "An automatic applications signature construction system for unknown traffic," Concurrency and Computation: Practice and Experience, vol. 22, 2010, pp. 1927-1944.

Wang, Yu, et al., "Generating regular expression signatures for network traffic classification in trusted network management," Journal of Network and Computer Applications, vol. 35, 2012, pp. 992-1000.

Yu, Fang, et al., "Gigabit Rate Packet Pattern-Matching Using TCAM," Proceedings of the 12th IEEE International Conference on Network Protocols (ICNP'04), 2004, 10 pages.

Xiao, Ming-Ming, et al., "Automatic Network Protocol Automaton Extraction," Third International Conference on Network and System Security, IEEE, 2009, pp. 336-343.

* cited by examiner

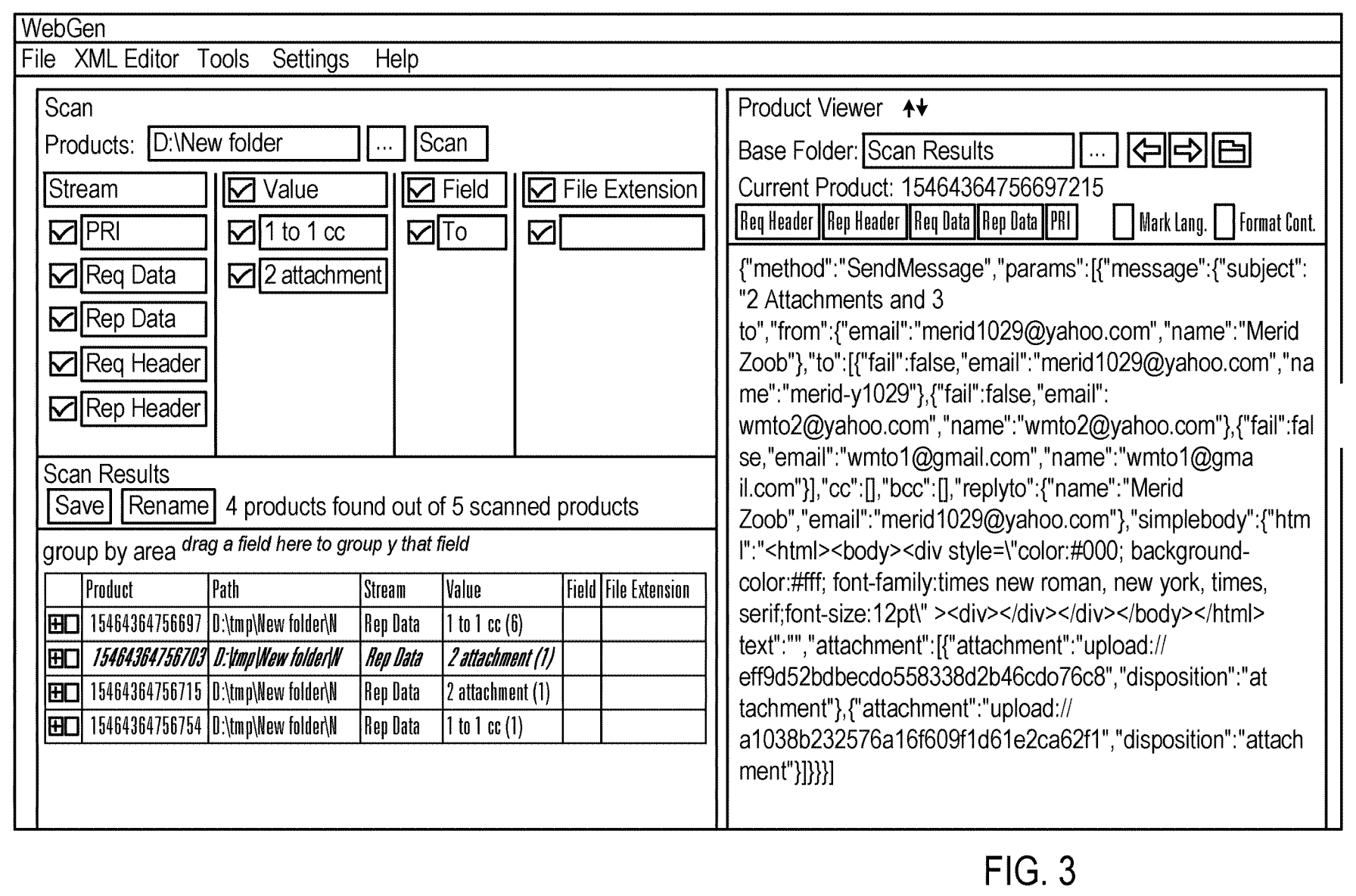

WebGen

File XML Editor Tools Settings Help

Scan

Products: D:\New folder ... Scan

| Stream | Value | Field | File Extension |
|---|---|---|---|
| ☑ PRI | ☑ 1 to 1 cc | ☑ To | ☑ |
| ☑ Req Data | ☑ 2 attachment | | |
| ☑ Rep Data | | | |
| ☑ Req Header | | | |
| ☑ Rep Header | | | |

Scan Results

Save Rename 4 products found out of 5 scanned products group by area *drag a field here to group y that field*

| | Product | Path | Stream | Value | Field | File Extension |
|---|---|---|---|---|---|---|
| ⊞☐ | 15464364756697 | D:\tmp\New folder\N | Rep Data | 1 to 1 cc (6) | | |
| ⊞☐ | ***15464364756703*** | ***D:\tmp\New folder\N*** | ***Rep Data*** | ***2 attachment (1)*** | | |
| ⊞☐ | 15464364756715 | D:\tmp\New folder\N | Rep Data | 2 attachment (1) | | |
| ⊞☐ | 15464364756754 | D:\tmp\New folder\N | Rep Data | 1 to 1 cc (1) | | |

Product Viewer

Base Folder: Scan Results ...

Current Product: 15464364756697215

Req Header Rep Header Req Data Rep Data PRI ☐ Mark Lang. ☐ Format Cont.

{"method":"SendMessage","params":[{"message":{"subject":"2 Attachments and 3 to","from":{"email":"merid1029@yahoo.com","name":"Merid Zoob"},"to":[{"fail":false,"email":"merid1029@yahoo.com","name":"merid-y1029"},{"fail":false,"email":"wmto2@yahoo.com","name":"wmto2@yahoo.com"},{"fail":false,"email":"wmto1@gmail.com","name":"wmto1@gmail.com"}],"cc":[],"bcc":[],"replyto":{"name":"Merid Zoob","email":"merid1029@yahoo.com"},"simplebody":{"html":"<html><body><div style=\"color:#000; background-color:#fff; font-family:times new roman, new york, times, serif;font-size:12pt\" ><div></div></div></body></html> text":"","attachment":[{"attachment":"upload://eff9d52bdbecdo558338d2b46cdo76c8","disposition":"attachment"},{"attachment":"upload://a1038b232576a16f609f1d61e2ca62f1","disposition":"attachment"}]}}}]

FIG. 3

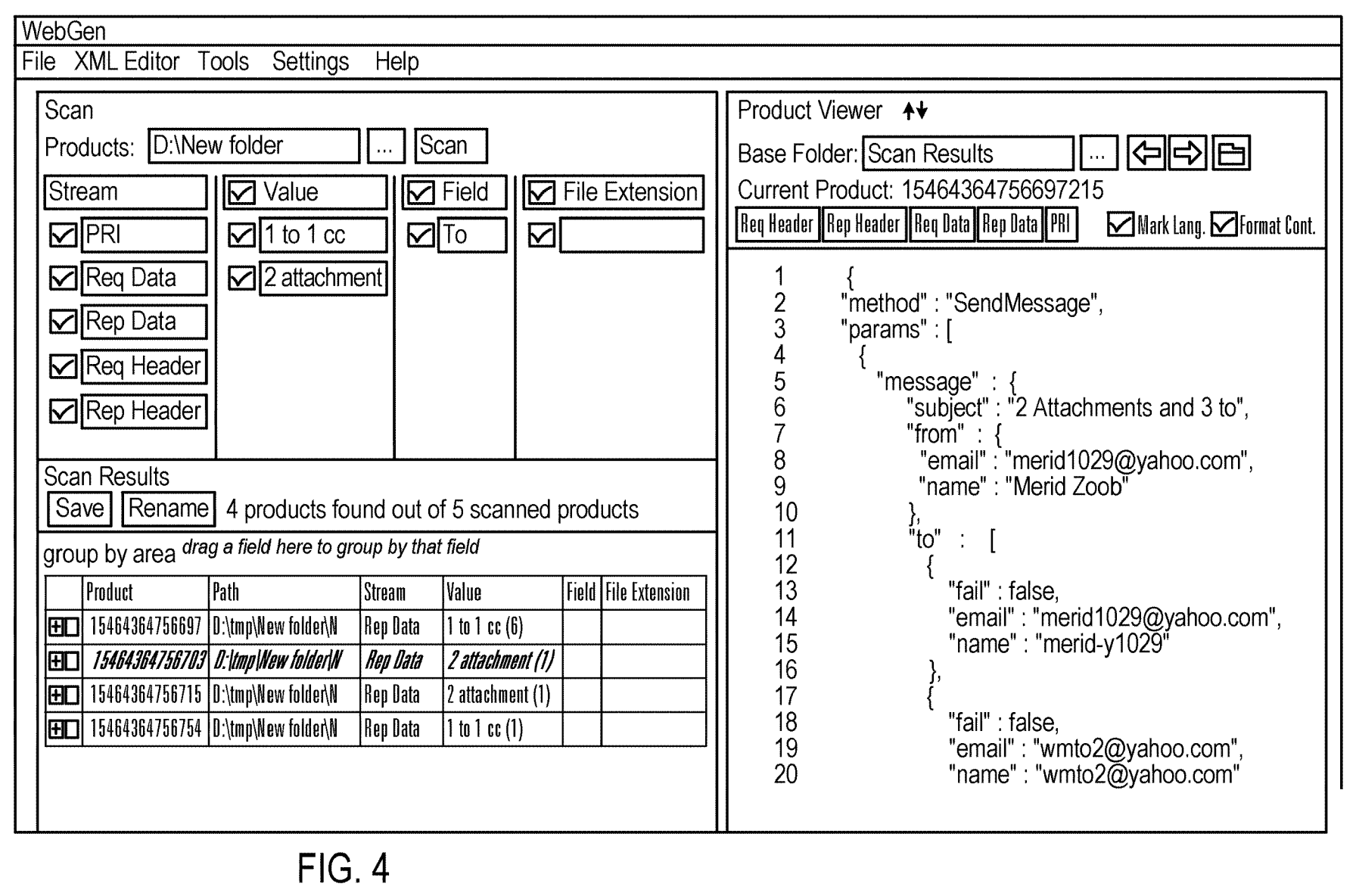

WebGen

File XML Editor Tools Settings Help

Scan

Products: D:\New folder ... Scan

| Stream | Value | Field | File Extension |
| --- | --- | --- | --- |
| PRI | 1 to 1 cc | To | |
| Req Data | 2 attachment | | |
| Rep Data | | | |
| Req Header | | | |
| Rep Header | | | |

Scan Results

Save Rename 4 products found out of 5 scanned products group by area *drag a field here to group by that field*

| | Product | Path | Stream | Value | Field | File Extension |
| --- | --- | --- | --- | --- | --- | --- |
| ⊞ | 15464364756697 | D:\tmp\New folder\N | Rep Data | 1 to 1 cc (6) | | |
| ⊞ | ***15464364756703*** | ***D:\tmp\New folder\N*** | ***Rep Data*** | ***2 attachment (1)*** | | |
| ⊞ | 15464364756715 | D:\tmp\New folder\N | Rep Data | 2 attachment (1) | | |
| ⊞ | 15464364756754 | D:\tmp\New folder\N | Rep Data | 1 to 1 cc (1) | | |

Product Viewer

Base Folder: Scan Results ...

Current Product: 15464364756697215

Req Header Rep Header Req Data Rep Data PRI Mark Lang. Format Cont.

```
{
"method" : "SendMessage",
"params" : [
  {
    "message" : {
        "subject" : "2 Attachments and 3 to",
        "from" : {
          "email" : "merid1029@yahoo.com",
          "name" : "Merid Zoob"
        },
        "to" : [
          {
            "fail" : false,
            "email" : "merid1029@yahoo.com",
            "name" : "merid-y1029"
          },
          {
            "fail" : false,
            "email" : "wmto2@yahoo.com",
            "name" : "wmto2@yahoo.com"
```

FIG. 4

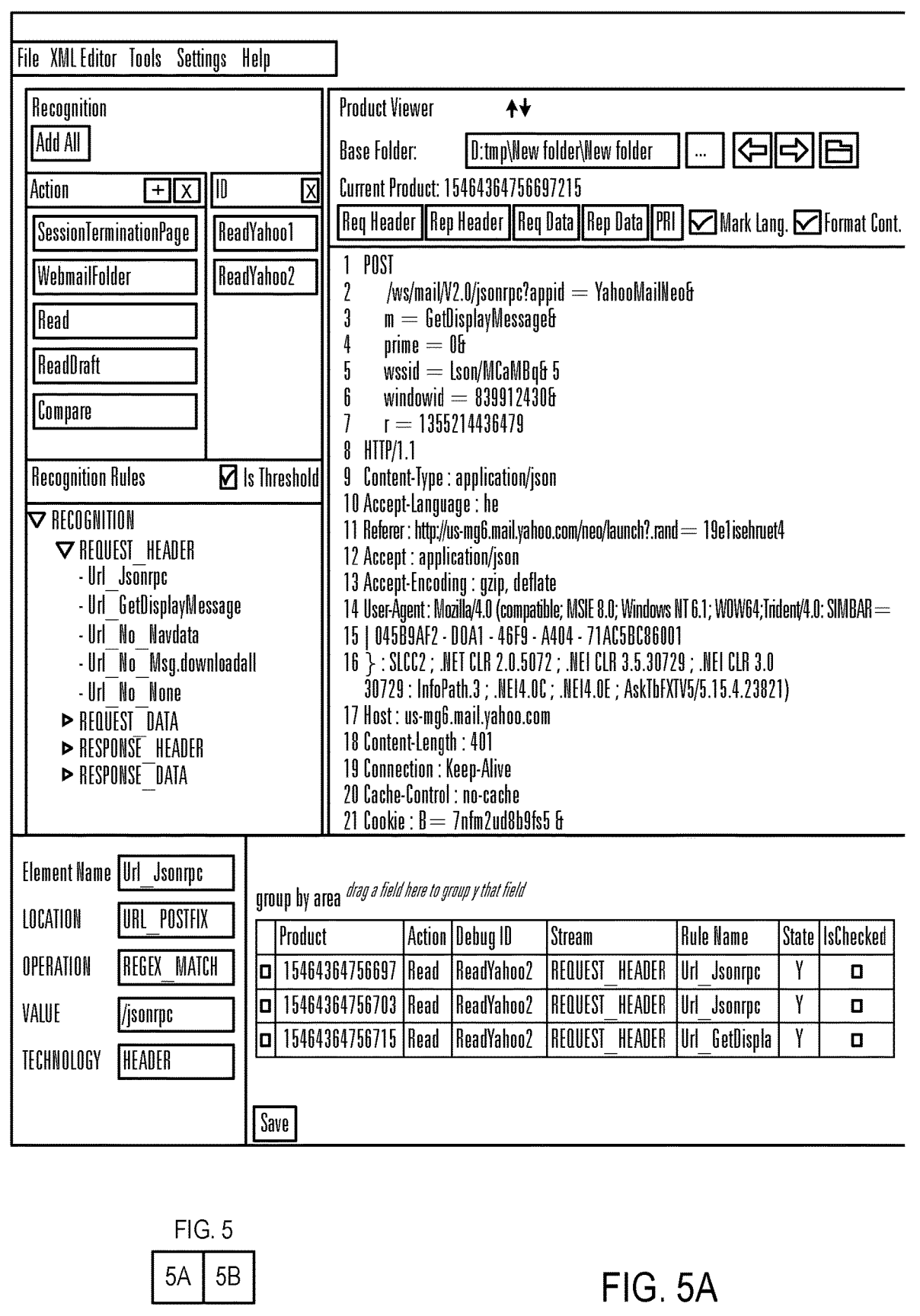

File XML Editor Tools Settings Help

Recognition
Add All

Action + X
SessionTerminationPage
WebmailFolder
Read
ReadDraft
Compare

ID X
ReadYahoo1
ReadYahoo2

Recognition Rules ☑ Is Threshold

▽ RECOGNITION
▽ REQUEST_HEADER
- Url_Jsonrpc
- Url_GetDisplayMessage
- Url_No_Navdata
- Url_No_Msg.downloadall
- Url_No_None
▷ REQUEST_DATA
▷ RESPONSE_HEADER
▷ RESPONSE_DATA Product Viewer
Base Folder: D:tmp\New folder\New folder ...
Current Product: 15464364756697215
Req Header | Rep Header | Req Data | Rep Data | PRI | ☑ Mark Lang. | ☑ Format Cont.

```
1  POST
2     /ws/mail/V2.0/jsonrpc?appid = YahooMailNeo&
3     m = GetDisplayMessage&
4     prime = 0&
5     wssid = Lson/MCaMBq& 5
6     windowid = 839912430&
7     r = 1355214436479
8  HTTP/1.1
9  Content-Type : application/json
10 Accept-Language : he
11 Referer : http://us-mg6.mail.yahoo.com/neo/launch?.rand = 19e1isehruet4
12 Accept : application/json
13 Accept-Encoding : gzip, deflate
14 User-Agent : Mozilla/4.0 (compatible; MSIE 8.0; Windows NT 6.1; WOW64;Trident/4.0: SIMBAR =
15 | 045B9AF2 - DOA1 - 46F9 - A404 - 71AC5BC86001
16 } : SLCC2 ; .NET CLR 2.0.5072 ; .NEI CLR 3.5.30729 ; .NEI CLR 3.0
   30729 : InfoPath.3 ; .NEI4.0C ; .NEI4.0E ; AskTbFXTV5/5.15.4.23821)
17 Host : us-mg6.mail.yahoo.com
18 Content-Length : 401
19 Connection : Keep-Alive
20 Cache-Control : no-cache
21 Cookie : B = 7nfm2ud8b9fs5 &
```

Element Name: Url_Jsonrpc
LOCATION: URL_POSTFIX
OPERATION: REGEX_MATCH
VALUE: /jsonrpc
TECHNOLOGY: HEADER group by area *drag a field here to group y that field*

| | Product | Action | Debug ID | Stream | Rule Name | State | IsChecked |
|---|---|---|---|---|---|---|---|
| ☐ | 15464364756697 | Read | ReadYahoo2 | REQUEST_HEADER | Url_Jsonrpc | Y | ☐ |
| ☐ | 15464364756703 | Read | ReadYahoo2 | REQUEST_HEADER | Url_Jsonrpc | Y | ☐ |
| ☐ | 15464364756715 | Read | ReadYahoo2 | REQUEST_HEADER | Url_GetDispla | Y | ☐ |

Save

FIG. 5

| 5A | 5B |
|---|---|

FIG. 5A

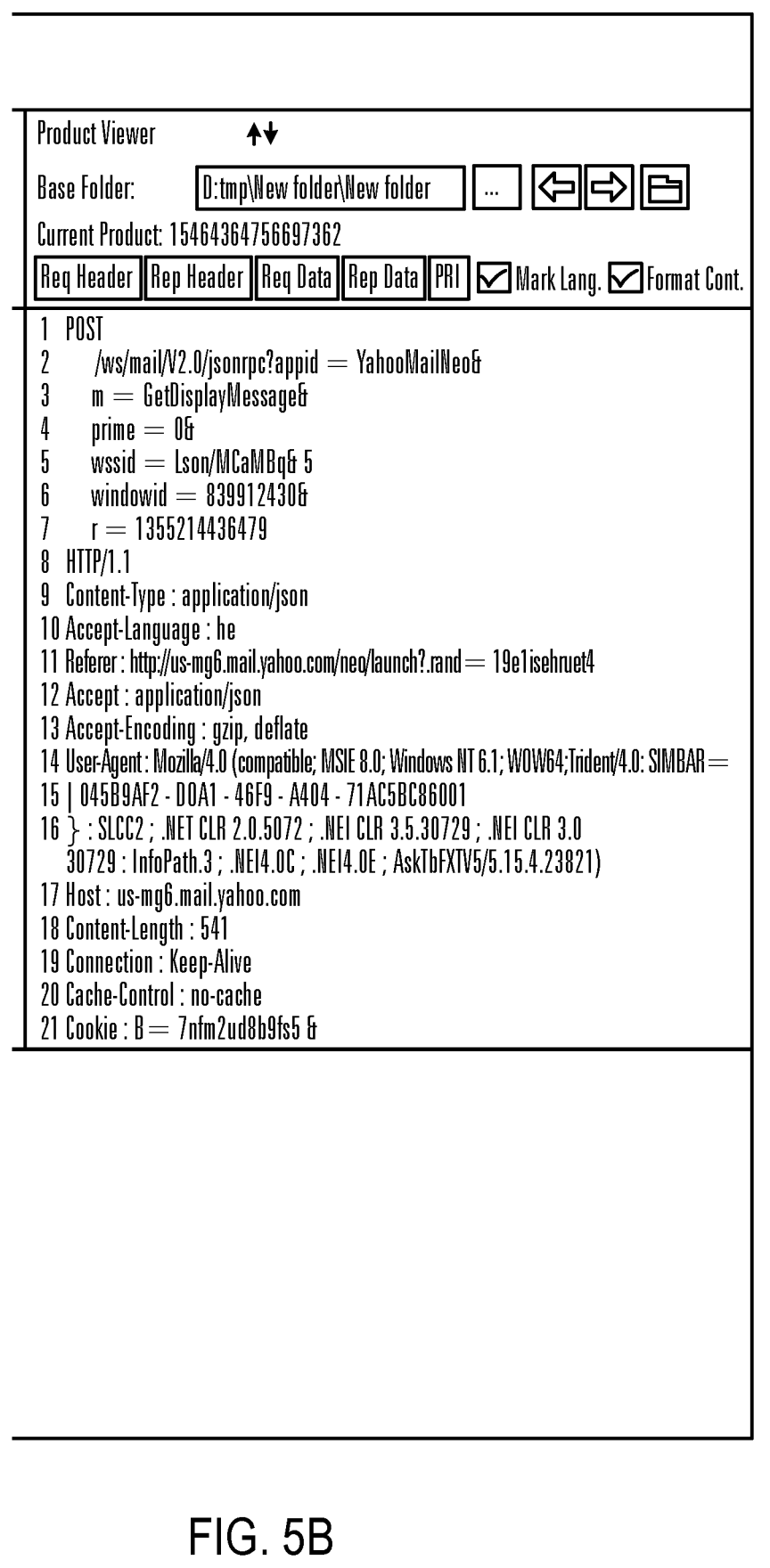

Product Viewer

Base Folder: D:tmp\New folder\New folder ...

Current Product: 15464364756697362

Req Header | Rep Header | Req Data | Rep Data | PRI | Mark Lang. | Format Cont.

```
1  POST
2      /ws/mail/V2.0/jsonrpc?appid = YahooMailNeo&
3      m = GetDisplayMessage&
4      prime = 0&
5      wssid = Lson/MCaMBq& 5
6      windowid = 8399124308
7      r = 1355214436479
8  HTTP/1.1
9  Content-Type : application/json
10 Accept-Language : he
11 Referer : http://us-mg6.mail.yahoo.com/neo/launch?.rand = 19e1isehruet4
12 Accept : application/json
13 Accept-Encoding : gzip, deflate
14 User-Agent : Mozilla/4.0 (compatible; MSIE 8.0; Windows NT 6.1; WOW64;Trident/4.0: SIMBAR =
15 | 045B9AF2 - DOA1 - 46F9 - A404 - 71AC5BC86001
16 } : SLCC2 ; .NET CLR 2.0.5072 ; .NEI CLR 3.5.30729 ; .NEI CLR 3.0
   30729 : InfoPath.3 ; .NEI4.0C ; .NEI4.0E ; AskTbFXTV5/5.15.4.23821)
17 Host : us-mg6.mail.yahoo.com
18 Content-Length : 541
19 Connection : Keep-Alive
20 Cache-Control : no-cache
21 Cookie : B = 7nfm2ud8b9fs5 &
```

FIG. 5B

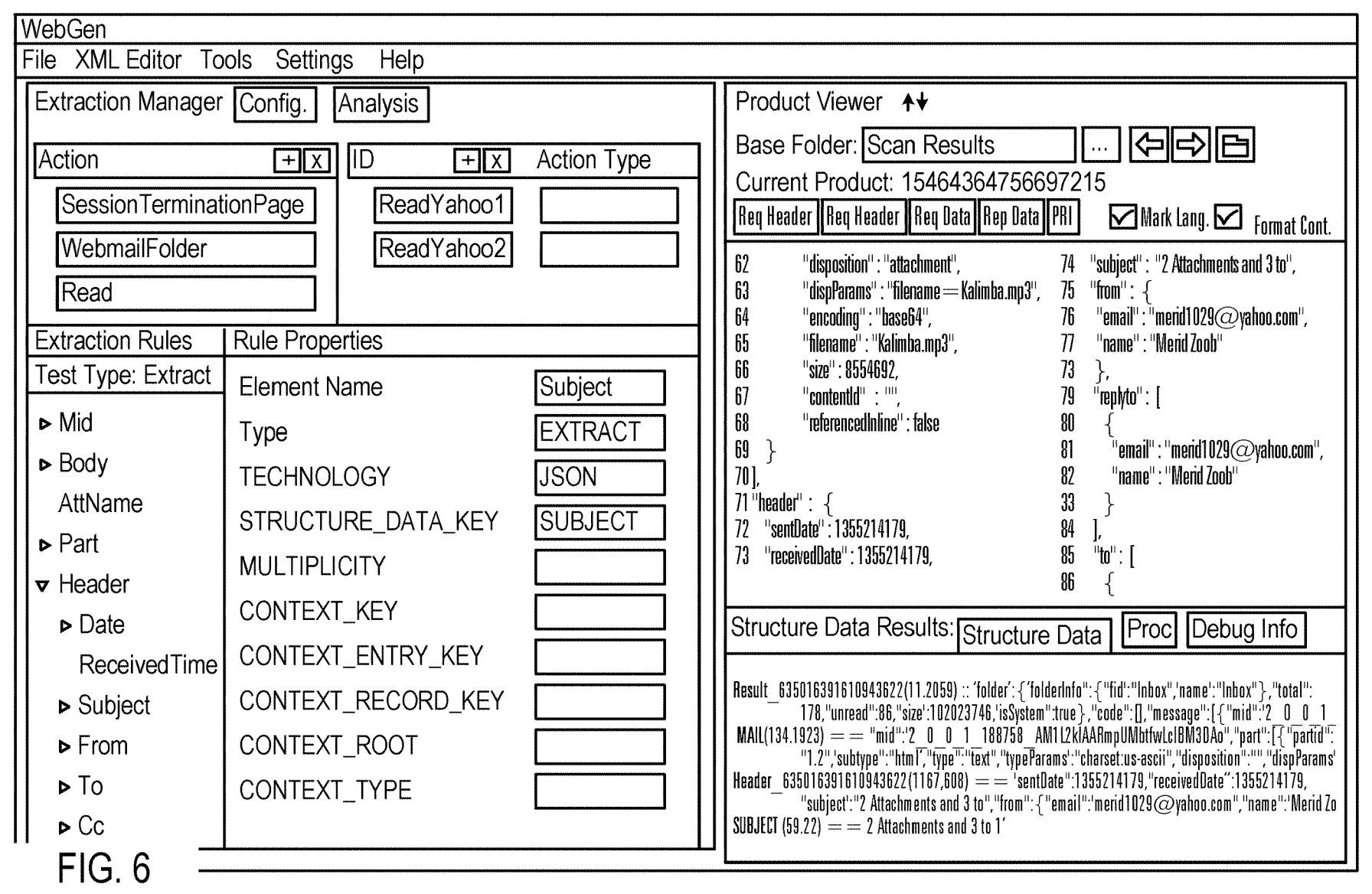

WebGen

File XML Editor Tools Settings Help

Extraction Manager | Config. | Analysis

| Action | ID | Action Type |
| --- | --- | --- |
| SessionTerminationPage | ReadYahoo1 | |
| WebmailFolder | ReadYahoo2 | |
| Read | | |

Extraction Rules

Test Type: Extract

- Mid
- Body
- AttName
- Part
- Header
  - Date
  - ReceivedTime
  - Subject
  - From
  - To
  - Cc Rule Properties

| Property | Value |
| --- | --- |
| Element Name | Subject |
| Type | EXTRACT |
| TECHNOLOGY | JSON |
| STRUCTURE_DATA_KEY | SUBJECT |
| MULTIPLICITY | |
| CONTEXT_KEY | |
| CONTEXT_ENTRY_KEY | |
| CONTEXT_RECORD_KEY | |
| CONTEXT_ROOT | |
| CONTEXT_TYPE | |

Product Viewer

Base Folder: Scan Results

Current Product: 15464364756697215

Req Header | Req Header | Req Data | Rep Data | PRI | Mark Lang. | Format Cont.

"disposition" : "attachment",
"dispParams" : "filename=Kalimba.mp3",
"encoding" : "base64",
"filename" : "Kalimba.mp3",
"size" : 8554692,
"contentId" : "",
"referencedInline" : false
}
],
"header" : {
"sentDate" : 1355214179,
"receivedDate" : 1355214179,
"subject" : "2 Attachments and 3 to",
"from" : {
"email" : "merid1029@yahoo.com",
"name" : "Merid Zoob"
},
"replyto" : [
{
"email" : "merid1029@yahoo.com",
"name" : "Merid Zoob"
}
],
"to" : [
{

Structure Data Results: Structure Data | Proc | Debug Info

Result_635016391610943622(11.2059) :: 'folder':{'folderInfo":{"fid":"Inbox",'name':"Inbox"},"total":178,"unread":86,"size':102023746,'isSystem":true},"code":[],"message":[{"mid":'2_0_0_1
MAIL(134.1923) == "mid":'2_0_0_1_188758_AM1L2kIAARmpUMbtfwLcIBM3DAo","part":[{"partId":"1.2",'subtype":"html","type":"text","typeParams':"charset:us-ascii","disposition":"","dispParams'
Header_635016391610943622(1167,608) == 'sentDate":1355214179,"receivedDate":1355214179,"subject':"2 Attachments and 3 to","from":{"email":'merid1029@yahoo.com","name":'Merid Zo
SUBJECT (59.22) == 2 Attachments and 3 to 1'

FIG. 6

SYSTEM AND METHOD FOR AUTOMATED GENERATION OF WEB DECODING TEMPLATES

FIELD OF THE DISCLOSURE

The present disclosure relates generally to communication analysis, and particularly to methods and systems for decoding communication protocols.

BACKGROUND OF THE DISCLOSURE

Some network communication analysis applications analyze network traffic in order to reconstruct network sessions conducted by certain network users. For example, NetScout Systems, Inc. (Westford, Mass.) offer a network security tool called nGenius®, which performs automated reconstruction and visual replay of network activities. A system data sheet entitled "nGenius Forensic Intelligence," 2012, is incorporated herein by reference. Another such tool called "Vantage" is offered by Actiance, Inc. (Belmont, Calif.). A data sheet entitled "Vantage—Governance Made Easy," 2012, is incorporated herein by reference. Other network security tools, mainly for enterprise fraud management, are offered by Intellinx Ltd. (Or Yehuda, Israel).

U.S. Patent Application Publication 2011/0238723, which is incorporated herein by reference, describes techniques for reconstructing Web sessions of target users. Communication packets, which are exchanged over a network during at least one network session associated with a target user, are accepted. The packets are processed so as to identify Web pages viewed by the target user during the network session and interactions between the target user and the viewed Web pages. The network session is reconstructed as viewed by the target user over time, based on the identified Web pages and interactions.

SUMMARY OF THE DISCLOSURE

An embodiment that is described herein provides a method including receiving network traffic that is sent using a communication protocol. Based on the network traffic, one or more recognition rules are formulated for recognizing target components of the network traffic, and one or more extraction rules are formulated for extracting target information from the recognized target components. The target information is extracted from subsequent network traffic that uses the communication protocol, using the recognition rules and the extraction rules.

In some embodiments, formulating the recognition rules and the extraction rules includes generating a structured template that specifies at least part of the target protocol, and extracting the target information includes parsing the subsequent network traffic using the template. In an embodiment, the method includes formulating one or more producer rules that specify actions to be applied to the target information, and extracting the target information includes acting on the extracted target information in accordance with the producer rules.

In a disclosed embodiment, formulating the recognition rules and the extraction rules includes identifying two or more occurrences of a target component or a target information item in the network traffic, and defining the rules so as to match the two or more occurrences. In an example embodiment, defining the rules includes automatically generating a regular expression that matches the two or more occurrences.

In another embodiment, formulating the recognition rules and the extraction rules includes testing one or more of the rules by applying the one or more of the rules to sample network traffic. In yet another embodiment, formulating the recognition rules and the extraction rules includes sharing one or more of the rules between multiple target components. In some embodiments, the communication protocol pertains to a Web-based application. The Web-based application may include one of a Web-based e-mail application, an instant-messaging application and a social network application.

There is additionally provided, in accordance with an embodiment that is described herein, apparatus including a memory and a processor. The memory is configured to store network traffic that has been sent using a communication protocol. The processor is configured to formulate, based on the network traffic, one or more recognition rules for recognizing target components of the network traffic and one or more extraction rules for extracting target information from the recognized target components, and, using the recognition rules and the extraction rules, to extract the target information from subsequent network traffic that uses the communication protocol.

The present disclosure will be more fully understood from the following detailed description of the embodiments thereof, taken together with the drawings in which:

BRIEF DESCRIPTION OF THE DRAWINGS

FIGS. 3-6 are example Graphical User Interface (GUI) screens of a system for Web decoding, in accordance with an embodiment that is described herein.

DETAILED DESCRIPTION OF EMBODIMENTS

Overview

In some network communication analysis applications, it is of interest to decode network sessions conducted by network users, and to extract information of interest from the decoded sessions. Decoding of network sessions can be used, for example, for data leakage prevention, cyber security, fraud prevention, enterprise application monitoring, regulatory compliance, or for any other purpose. Applications of this sort can be used, for example, by Cyber Security analysts and other investigation bodies, as well as in enterprise systems.

Decoding and extracting information from a network session typically requires some knowledge regarding the structure of the communication protocol being used. In practice, however, some sessions may use a communication protocol whose structure is not known in advance to the analysis application.

Embodiments that are described herein provide improved methods and systems for decoding communication protocols having an unknown structure. In the disclosed embodiments, a decoding system analyzes network traffic that uses such a communication protocol, and semi-automatically generates a structured template for decoding the protocol. In an example embodiment, the traffic comprises HTTP transactions used in some unknown variant of a Web-based e-mail or social network application, and the system generates an Extensible Markup Language (XML) template for parsing such transactions.

The disclosed system enables an analyst to review sample transactions, and identify target components of the protocol that contain target information of interest. The system typically generates a set of rules with the assistance of the analyst. In an embodiment, the rules comprise recognition rules that specify how to identify the target components of the protocol, extraction rules that specify the location of the target information within the target components, and producer rules that specify how to act upon the extracted target information.

The rules are then formatted to produce the desired template, which is used for decoding subsequent network traffic. Examples of Graphical User Interface (GUI) screens, which demonstrate the rule definition process, are given herein. In some embodiments, the decoding system generates multiple templates for multiple types of transactions of a given protocol, while sharing common components that are similar or identical in different transaction types. This technique provides a considerable reduction in data structure size.

The disclosed techniques can be used, for example, for decoding Web-based applications such as Web-mail, Instant Messaging (IM) and social networking applications. All of these Web applications are considered examples of target protocols.

System Description

Figure 1:
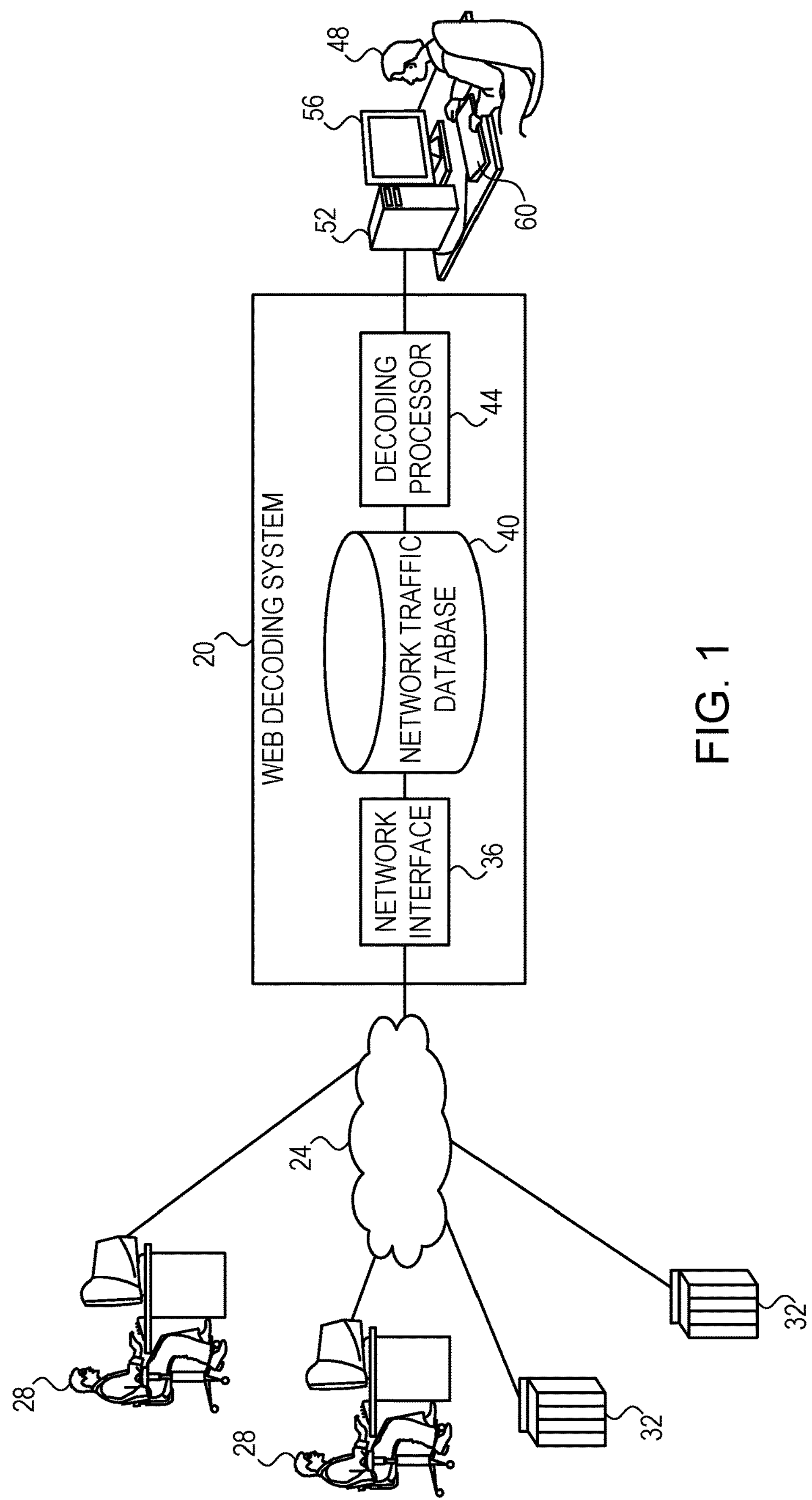
FIG. 1 is a block diagram that schematically illustrates a system for Web decoding, in accordance with an embodiment that is described herein.

FIG. 1 is a block diagram that schematically illustrates a system 20 for Web decoding, in accordance with an embodiment that is described herein. System 20 receives communication packets from a computer network 24, in which users 28 conduct network sessions. The system processes the packets so as to reconstruct and present network sessions conducted by certain users 28. In the embodiments described herein, network 24 comprises the Internet. Alternatively, however, network 24 may comprise any other suitable computer network, such as an Intranet of a certain organization.

Users 28 conduct network sessions in network 24, such as by interacting with Web servers 32. The users may browse Web sites, exchange e-mail messages using Web-based e-mail applications, use instant messaging applications, access forums, use Web-based chat applications, use Web-based file transfer and/or media (e.g., audio or video) transfer applications, use peer-to-peer applications or conduct any other suitable kind of network session.

Typically, users 28 conduct the network sessions by operating Web browsers on their computers. During a given network session, the elements of network 24 (e.g., the user computer and the server with which the user computer communicates) generate packets, such as Hyper-Text Transfer Protocol (HTTP) request and response packets. System 20 uses these packets to extract information of interest from the network sessions, using methods that are described in detail below.

In the example of FIG. 1, system 20 comprises a network interface 36, a traffic database 40 and a decoding processor 44. Network interface 36 receives the packets from network 24, and the packets are stored in database 40 for analysis. In some embodiments, database holds the packets that are associated with certain users. Typically, each packet is stored with a time stamp, which indicates the reception time of the packet. In some embodiments, each packet is indexed by the identity of the user, the time stamp and a full Uniform Resource Locator (URL).

Decoding processor 44 retrieves packets from database 40 and uses the packets to reconstruct network sessions of certain users. The packets are typically arranged in database separately per user 28, so that processor 44 is able to access the packets associated with a given user. The reconstructed sessions are presented to an operator, e.g., an analyst or investigator, on a display 56 of an operator terminal 52. The operator may manipulate the manner in which the session is displayed, or otherwise provide input to system 20 using input devices 60, such as a keyboard or mouse.

The system configuration of FIG. 1 is an example configuration, which is show purely for the sake of conceptual clarity. In alternative embodiments, any other suitable system configuration can also be used. For example, the functions of decoding processor 44 may be partitioned among multiple servers or other computing platforms, or they can be combined with other traffic analysis functions in the same server or computing platform.

In some embodiments, processor 44 comprises a general-purpose computer, which is programmed in software to carry out the functions described herein. The software may be downloaded to the computer in optical or electronic form, over a network, for example, or it may, additionally or alternatively, be provided and/or stored on non-transitory tangible media, such as magnetic, optical, or electronic memory. Database 40 may comprise any suitable storage device, such as magnetic media or solid state memory.

Decoding of Communication Protocols Having Unknown Structure

In some practical scenarios, certain sessions over network 24 may be conducted using communication protocols whose structure is not known a-priori to system 20. For example, a user 28 may use an unknown variant of a Web-based e-mail, instant-messaging or social network protocol. In order to extract information of interest from such sessions, system 20 and operator 48 carry out an automated process of decoding the protocol.

Figure 2:
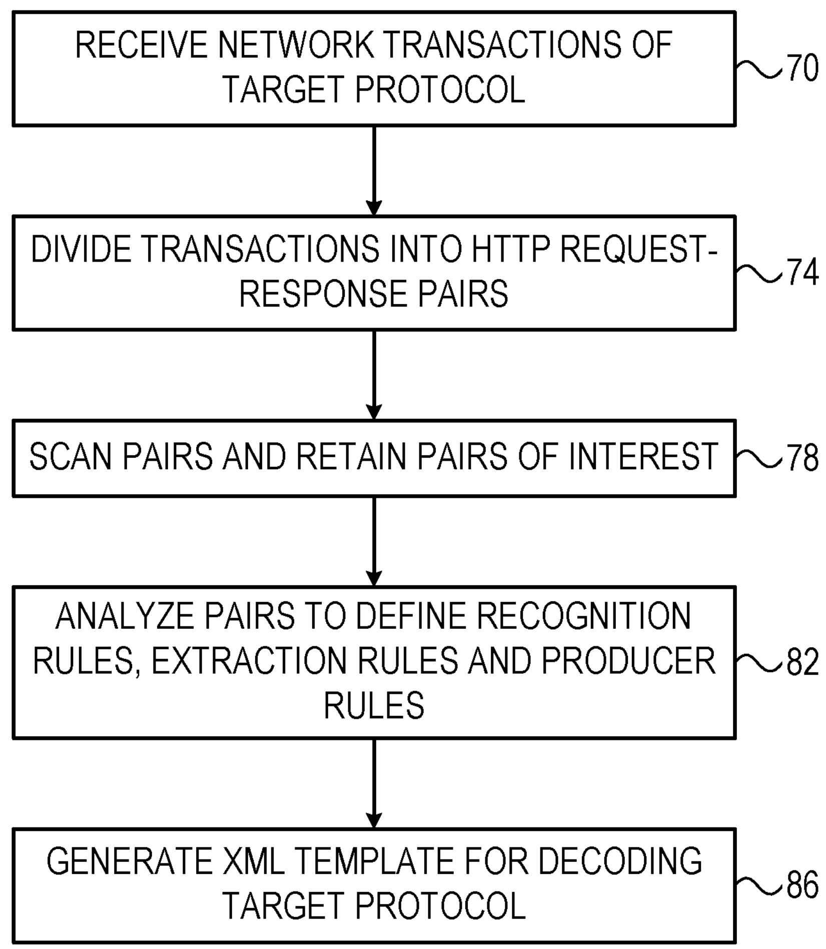
FIG. 2 is a flow chart that schematically illustrates a method for decoding a communication protocol having an unknown structure, in accordance with an embodiment that is described herein.

FIG. 2 is a flow chart that schematically illustrates a method for decoding a communication protocol whose structure is unknown, in accordance with an embodiment that is described herein. The protocol in question is referred to as a target protocol.

In the present example, the target protocol is used in a Web-based e-mail application, and the method generates a template for decoding "compose" transactions of this protocol (i.e., transactions in which user 28 composes a new e-mail message). Alternatively, the disclosed techniques can be used with any other suitable type of e-mail transaction protocol, and with any other suitable type of protocol, e.g., a social network protocol, instant messaging protocol, peer-to-peer protocol and file sharing protocol, to name just a few.

The method begins with processor 44 of system 20 receiving a sample set of network transactions that use the target protocol, or at least suspected of using it, at an input step 70. In the present example the transactions comprise HTTP transactions, although various other types of transactions can be analyzed in alternative embodiments. On top of HTTP, the payload can be formatted with various technologies, such as HTML or JSON.

In some embodiments, the sample transactions are generated by the system using the Web application in question. In these embodiments, the content of the transactions is known, and this knowledge simplifies the decoding process. In alternative embodiments, the transactions are received from network 24 via interface 36 and stored in database 40.

Processor 44 divides the transactions into HTTP request-response pairs, at a pairing step 74. The processor scans the request-response pairs and retains the pairs that are of interest, at a scanning step 78. In the present example, the operator wishes to retain only the request-response pairs corresponding to "compose" transactions. Operator 48 typically specifies a certain condition that characterizes the pairs of interest, and processor 44 retains only the pairs that meet the condition.

An example condition may comprise a string, a regular expression, a file extension or other element that should occur in the pairs. The occurrences may be restricted to the header and/or payload of the HTTP request and/or response. Alternatively, various other conditions can be defined. In an embodiment, processor 44 runs a GUI that presents one or more of the request-response pairs to operator 48, and enables the operator to specify and test various scanning conditions. Example GUI screens of this sort is shown in FIGS. 3 and 4 below.

After this initial screening process, processor 44 and operator 48 analyze the remaining request-response pairs so as to generate a set of decoding rules, at a rule generation step 82. The rule generation process is typically divided into three stages that generate three types of rules: Recognition rules, extraction rules and producer rules.

The recognition rules specify how to identify target components of the protocol. In an e-mail "compose" transaction, for example, the target components may comprise the "To:" field, the "From:" field, the attachment field or the subject-line field of the composed e-mail message. Depending on the protocol, the target components may be identified in different ways. For example, a certain field of an e-mail message may be preceded by a certain fixed string or combination of control characters, or it may appear at a certain fixed offset relative to some reference point in the traffic.

In an embodiment, processor 44 runs a GUI that presents one or more of the request-response pairs to operator 48. The GUI enables the operator to search for strings or other conditions for identifying the target components, and to test whether the conditions are indeed indicative of the desired components.

In an example embodiment, the GUI enables the operator to display two request-response pairs simultaneously and look for similarities between them. An example GUI screen of this sort is shown in FIG. 5 below. For example, the sample transactions received at step 70 may comprise several e-mail messages that contain known subject line text. By searching for this known text in the different messages, the operator is able to formulate a recognition rule specifying how to locate the subject-line field in the protocol.

In some embodiments, formulation of the recognition rules is performed automatically by processor 44. In an example embodiment, operator 48 marks the identified occurrences of a target component in multiple request-response transactions, and processor 44 finds a recognition rule that matches these occurrences with high detection probability and small false detection probability.

The above-described process of formulating recognition rules may be repeated for any desired number of target components that contain information of interest.

After formulating the recognition rules, processor and operator 48 formulate extraction rules that specify the location of the target information within the target components of the protocol. For example, an extraction rule may specify the location of the subject-line string within the subject-line field of the protocol. Such a rule may specify, for example, a combination of characters that marks the beginning or end of the target information, an offset from some reference point in the traffic at which the target information begins, or any other suitable specification. The process of formulating extraction rules may be repeated for any desired number of target information items.

In an embodiment, processor 44 runs a GUI that presents one or more of the request-response pairs to operator 48, and enables the operator to identify the target information within the target components. The GUI also enables the operator to test whether a certain extraction rule is indeed indicative of the desired target information. An example GUI screen of this sort is shown in FIG. 6 below.

In some embodiments, processor 44 and operator 48 formulate producer rules that specify how to act upon the extracted target information. In an example embodiment, the producer rules specify a common format that is independent of the underlying protocol. For e-mail applications, for example, the producer rules may specify a common format for outputting target information from e-mail messages (e.g., a common format for the "To:", "From:", attachment and subject-line information). This format is independent of the e-mail protocol that was decoded by the system. In this embodiment, system 20 will output information from different e-mail applications (e.g., Gmail and Yahoo! mail) using the same application-independent format.

Additionally or alternatively, the producer rules may define any other suitable action (sometimes referred to as "business logic") to be applied to the extracted target information.

Based on the recognition rules, extraction rules and producer rules, processor 44 generates a structured template for parsing the target protocol, at a template generation step 86. In the present example, the template comprises an XML template, although various other types of templates can also be used. Processor 44 uses the template for decoding subsequent traffic from network 24 that uses the target protocol.

In some embodiments, processor 44 (under control of operator 48) tests one or more of the rules, or even the complete template. Testing typically involves applying the rules or template to sample traffic. The sample traffic may comprise positive examples (i.e., traffic generated using the target protocol) and negative examples (i.e., traffic that was not generated using the target protocol, in order to check for false rule matching).

ADDITIONAL EMBODIMENTS AND VARIATIONS

When using the method of FIG. 2, processor 44 typically generates multiple templates corresponding to multiple types of target transactions. For an e-mail application, for example, processor 44 may generate one XML template for decoding "compose" transactions, another XML template for decoding "reply" transactions, yet another XML template for decoding "forward" transactions, and so on.

In practice, different types of transactions may have similar target components. This sort of situation is common, for example, in Web-based applications such as Web-mail, instant messaging and social network applications. For example, in a Web-mail protocol, the subject-line component may have the same structure in "reply" and "forward" transactions, but the two types of transactions may differ in some other component.

In some embodiments, processor 44 generates such multiple templates while sharing the common components between them. In other words, the common components are represented only once and not duplicated in each individual template. This technique reduces the size of the data structures used for storing the templates in system 20, as well as enables shared utilities for decoding the different transactions and handling the data.

In some embodiments, the rules and templates generated by system 20 support language variations that may be used in the target protocol. In an e-mail application, for example, the "From:" field may be marked in the traffic with different strings in different language versions of the application. Instead of generating a different template for each language, processor 44 may support multiple languages within the same set of rules and template.

Example User-Interface Screens

FIGS. 3-6 are example Graphical User Interface (GUI) screens of system 20, in accordance with an embodiment that is described herein. This GUI can be used, for example, to interact with operator 48 using operator terminal 52.

FIG. 3 shows an example GUI for the scanning stage (step 78 of FIG. 2) that scans and retains only request-response pairs that are of interest. The right-hand-side window entitled "Current Product" displays one of the request-response pairs, in the present example showing the data payload of the request.

FIG. 4 also shows the GUI screen of the scanning stage. In this example, however, the currently-examined request-response pair is displayed in structured form, as opposed to the raw format of FIG. 3.

FIG. 5 shows an example GUI for the recognition stage in which the recognition rules are found and formulated. The present example shows an HTTP transaction after formatting. In this embodiment, the GUI recognizes the underlying format and presents the transaction in accordance with the recognized format (e.g., bold HTTP Header and Value, JSON Format or HTML Format).

In this example, two request-response pairs are displayed side-by-side in two "Current Product" windows. This presentation enables the operator to deduce recognition rules by searching for known fields and finding similarities between request-response pairs.

FIG. 6 shows an example GUI for the extraction stage in which the extraction rules are found and formulated. In this example, the right-hand-side window shows the HTTP data to the operator. In the left-hand-side window, the operator constructs the extraction rules, e.g., by selecting the appropriate action, and automatically obtaining the field or fields that should be extracted. The operator then defines an extraction rule according to the desired pattern. The operator can test the rule and have the results displayed in the left-hand-side window. The GUI outputs the result in the original buffer.

Although the embodiments described herein mainly address network security applications, the principles of the present disclosure can also be used for other applications such as monitoring network activities of suspects such as criminals or terrorists.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

receiving, via a network interface of a decoding system, sample network packets exchanged with a web server that correspond with a target transaction type, wherein the packets are exchanged using a transfer protocol, wherein the packets comprise data of a target communication protocol with an unknown structure;

presenting, via a graphical user interface run by a decoding processor of the decoding system, one or more of the packets on a display of an operator terminal;

receiving, by the decoding processor, inputs from the operator terminal marking occurrences of a target field in multiple of the packets for formulating a recognition rule for recognizing the target field in the data of the target communication protocol;

receiving, by the decoding processor, one or more inputs from the operator terminal identifying target information within the target field for formulating an extraction rule for extracting the target information from the recognized target field;

generating, by the decoding processor, a structured template for parsing the target transaction type of the target communication protocol based on the recognition rule and the extraction rule;

receiving, via the network interface, subsequent network packets exchanged between one or more user computers and the web server, the subsequent network packets are encoded with the target communication protocol; and decoding, by the decoding processor, the subsequent network packets using the recognition rule and the extraction rule of the structured template to extract the target information from the subsequent network packets.

2. The method according to claim 1, and comprising formulating one or more producer rules that specify actions to be applied to the target information, wherein extracting the target information comprises acting on the extracted target information in accordance with the producer rules.

3. The method according to claim 1, wherein formulating the recognition rules and the extraction rules comprises identifying two or more occurrences of a target field or a target information item in the network traffic, and defining the rules so as to match the two or more occurrences.

4. The method according to claim 3, wherein defining the rules comprises automatically generating a regular expression that matches the two or more occurrences.

5. The method according to claim 1, wherein formulating the recognition rules and the extraction rules comprises testing one or more of the rules by applying the one or more of the rules to sample network traffic.

6. The method according to claim 1, wherein formulating the recognition rules and the extraction rules comprises sharing one or more of the rules between multiple target fields.

7. The method according to claim 1, wherein the communication protocol pertains to a Web-based application.

8. The method according to claim 1, wherein the Web-based application comprises one of a Web-based e-mail application, an instant-messaging application and a social network application.

9. The method according to claim 1, wherein presenting, via the graphical user interface, one or more of the packets on the display of the operator terminal comprises presenting multiple packets concurrently.

10. The method according to claim 9, wherein the inputs from the operator terminal comprise marking occurrences of the target field in the multiple packets, wherein the extraction rule is formulated by automatically generating a regular expression that matches the occurrences of the target field in the multiple packets.

11. A method, comprising:

receiving, via a network interface of a decoding system, sample network packets exchanged with a web server that correspond with a target transaction type, wherein the packets are exchanged using a transfer protocol, wherein the packets comprise data of a target communication protocol with an unknown structure;

receiving, by a decoding processor of the decoding system, one or more inputs from an operator terminal for formulating one or more recognition rules for recognizing target fields in the data of the target communication protocol and one or more extraction rules for extracting target information from the recognized target fields, wherein the one or more extraction rules specifies a location of the target information within the target fields;

generating, by the decoding processor, a structured template for parsing the target transaction type of the target communication protocol based on the one or more recognition rules and the one or more extraction rules;

receiving, via the network interface, subsequent network packets exchanged between one or more user computers and the web server, the subsequent network packets are encoded with the target communication protocol; and decoding, by the decoding processor, the subsequent network packets using the one or more recognition rules and the one or more extraction rules of the structured template to extract the target information from the subsequent network packets.

12. The method according to claim 11, wherein the location is specified by a combination of characters that marks a beginning or end of the target information, or an offset from a reference point.

13. A method, comprising:

receiving, via a network interface of a decoding system, sample network packets exchanged with a web server that correspond with a target transaction type, wherein the packets are exchanged using a transfer protocol, wherein the packets comprise data of a target communication protocol with an unknown structure;

receiving, by a decoding processor of the decoding system, one or more inputs from an operator terminal for formulating one or more recognition rules for recognizing target fields in the data of the target communication protocol, one or more extraction rules for extracting target information from the recognized target fields, and one or more producer rules for specifying how to act upon the extracted target information, wherein the one or more producer rules specify a common format for outputting the extracted target information that is independent of the target communication protocol;

generating, by the decoding processor, a structured template for parsing the target transaction type of the target communication protocol based on the one or more recognition rules, the one or more extraction rules, and the one or more producer rules;

receiving, via the network interface, subsequent network packets exchanged between one or more user computers and the web server, the subsequent network packets are encoded with the target communication protocol; and decoding, by the decoding processor, the subsequent network packets using the one or more recognition rules and the one or more extraction rules of the structured template to extract the target information from the subsequent network packets and output the extracted target information in the common format.

* * * * *